Patented Aug. 21, 1928.

1,681,717

UNITED STATES PATENT OFFICE.

GEORGE STAFFORD WHITBY, OF MONTREAL, QUEBEC, CANADA, ASSIGNOR TO THE ROESSLER & HASSLACHER CHEMICAL CO., OF NEW YORK, N. Y., A CORPORATION OF NEW YORK.

SUBSTITUTED THIURAM POLYSULPHIDES AND PROCESS OF MAKING THE SAME.

No Drawing. Application filed January 27, 1926. Serial No. 84,153.

The object of this invention is the preparation of new and useful compositions of matter by the treatment of salts of dithiocarbamic acids with sulphur chlorides. More particularly this invention relates to the products formed by treating the salts of substituted dithiocarbamic acids with sulphur monochloride or sulphur dichloride. I have found that the substances so formed may be used as accelerators of the vulcanization of rubber. This use is claimed by me in a copending application S. N. 84,154, filed by me of even date herewith.

Throughout the specification I refer to specific sulphur chlorides as sulphur monochloride and sulphur dichloride giving formulas corresponding respectively to $S_2Cl_2$ and $SCl_2$. I do not wish to be limited in this since there is some doubt as to the existence or structure of the dichloride. However, I have found that by using the commonly called dichloride I obtain a definite compound of the same class as, but differing from, the product obtained by using the monochloride. Furthermore, sulphur is very soluble in these sulphur chlorides and may be present in molecules of a polysulphide nature having several loosely bound S atoms in addition to those ascribed to them by the formulæ. I therefore prefer to express the sulphur chlorides above referred to as $S_xCl_2$ wherein $x$ represents a whole number other than zero.

The dithiocarbamates used in my processes are represented by the general formula:

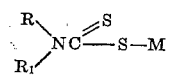

wherein R and $R_1$ are any similar or dissimilar organic radicals and M is any metallic radical or equivalent group, such as zinc, sodium, potassium or ammonium, etc. The above, as will be seen, are disubstituted dithiocarbamates. I wish it understood that in case a "piperidyl-" or any other bivalent radical is used, R and $R_1$ will become a single radical utilizing the double bond, but the dithiocarbamate will still be considered disubstituted.

I have discovered that if such a salt is treated with a sulphur chloride a reaction takes place between two moles of the dithiocarbamate and one mole of the sulphur chloride to form a new composition of matter. Substantially, I believe this reaction to be as follows:

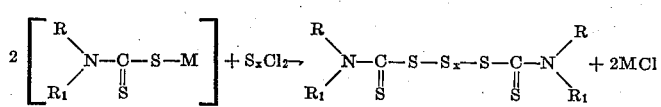

If, for example, ammonium phenyl ethyl dithiocarbamate is treated with sulphur monochloride a reaction takes place which I represent as follows:

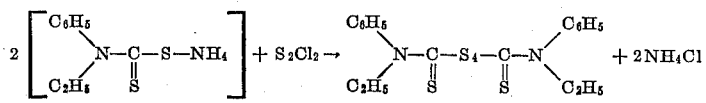

or if sulphur dichloride is used

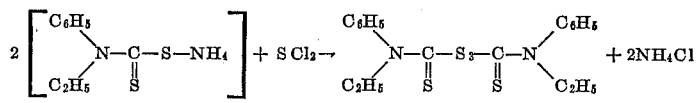

The ammonium chloride or, as the case may be, the metal chloride is always formed at the end of the reaction. The arrangement of the central sulphur atoms represented as $S_x$, $S_4$ or $S_3$ is unknown to me. I have, however, found that definite compositions are always formed as is shown by the properties of the various products. The products are simply named as substituted thiuram-polysulphides.

I have prepared analogous materials from several dithiocarbamates and find the reaction similar in all cases. I have employed the dimethyl-, diethyl-, dibutyl-, dipropyl-, "piperidyl-", phenyl methyl-, phenyl ethyl-, dithiocarbamates. I have used zinc, sodium potassium and ammonium salts of these in a variety of liquids. I have found suitable media to be benzene, petroleum ether or sulphuric ether.

The following examples will serve to illustrate the methods of preparation that I have used:

*I. Di-phenylethyl-thiuram tetrasulphide.*

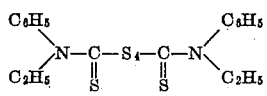

338 grams of dry ammonium phenyl-ethyl-dithiocarbamate were suspended in petroleum naphtha, cooled with ice, and 107 grams sulphur monochloride ($S_2Cl_2$) diluted with petroleum naphtha was run in gradually from a dropping funnel while stirring the mixture. The precipitate was filtered off, washed with naphtha, allowed to dry, suspended in water, filtered, washed with water and dried. 276.5 grams of dry product were obtained; this amounts to a 76.7% yield. The melting point of the material was 142° C. After recrystallization from carbon disulphide the material analyzed 41.75% sulphur; after recrystallization from toluene it analyzed 41.25%.

*II. Di-phenylethyl thiuram trisulphide.*

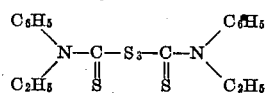

35 grams well powdered amonium phenyl methyl dithiocarbamate suspended in about 200 ccs. petroleum ether cooled with ice was treated with 5.3 ccs. $SCl_2$ diluted with petroleum ether; the precipitate was filtered off and washed with petroleum ether, then washed with water. Product dried gave 21.5 grams of a pale yellow powder. Yield 62.1%; melting point 133° C.

*III. Di-phenylmethyl thiuram tetrasulphide.*

20 grams sodium phenylmethyl dithiocarbamate were treated in ether with 6.6 grams sulphur monochloride. The residue was washed with ether to remove excess of sulphur monochloride, then dried and suspended in water to remove sodium chloride and any unreacted dithiocarbamate. The product was filtered, washed on the filter with water, alcohol and ether, and finally dried. Melting point about 117° C. Product was completely soluble in corbon disulphide, and no sulphur was thrown down when acetone was added; slightly soluble in alcohol. Recrystallized from hot 95% alcohol gave a product which analyzed 55 to 57% S.

What I claim is:

1. A process for the preparation of a composition of matter consisting in reacting an ammonium salt of a substituted dithiocarbamic acid with a chloride of sulphur corresponding to the general formula $S_xCl_2$ wherein $x$ represents a whole number other than zero.

2. A process for the preparation of a composition of matter consisting in reacting a salt of a disubstituted dithiocarbamic acid with a chloride of sulphur corresponding to the general formula $S_xCl_2$ wherein $x$ represents a whole number other than zero.

3. A process for the preparation of a composition of matter consisting in reacting a salt of a phenyl ethyl dithiocarbamic acid with a chloride of sulphur corresponding to the general formula $S_xCl_2$ wherein $x$ represents a whole number other than zero.

4. A process for the preparation of a composition of matter consisting in reacting the ammonium salt of a phenyl ethyl dithiocarbamic acid with sulphur monochloride.

5. A composition of matter comprising diphenyl-diethyl thiuram tetrasulphide.

6. A composition of matter comprising an organic compound having as its nucleus a radical corresponding to the formula

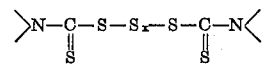

wherein $x$ represents a whole number other than zero.

7. A composition of matter comprising an organic compound having as its nucleus a radical corresponding to the formula

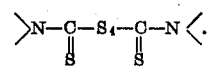

8. A composition of matter comprising a tetra-substituted organic compound having as its nucleus a radial corresponding to the formula

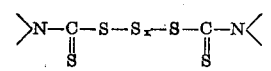

wherein $x$ represents a whole number other than zero.

9. A composition of matter comprising a dialkyl-diaryl substiuted organic compound having as its nucleus a radical corresponding to the formula

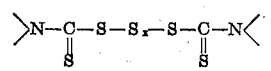

wherein $x$ represents a whole number other than zero.

10. A composition of matter comprising a tetra substituted thiuram tetrasulphide.

11. The method of producing new organic polysulphides which comprises treating salts of dithioacids with sulphur chloride.

12. The method of producing new organic polysulphides which comprises treating zinc salts of dithioacids with sulphur chloride.

Signed at Perth Amboy, in the county of Middlesex and State of New Jersey this 16th day of January A. D. 1926.

GEORGE STAFFORD WHITBY.